(12) United States Patent
Deshpande

(10) Patent No.: US 7,451,447 B1
(45) Date of Patent: Nov. 11, 2008

(54) METHOD, COMPUTER PROGRAM AND APPARATUS FOR OPERATING SYSTEM DYNAMIC EVENT MANAGEMENT AND TASK SCHEDULING USING FUNCTION CALLS

(75) Inventor: Akash R. Deshpande, San Jose, CA (US)

(73) Assignee: ARC International IP, Inc., San Jose, CA (US)

( * ) Notice: Subject to any disclaimer, the term of this patent is extended or adjusted under 35 U.S.C. 154(b) by 656 days.

(21) Appl. No.: 10/669,542

(22) Filed: Sep. 23, 2003

Related U.S. Application Data

(63) Continuation of application No. 09/370,618, filed on Aug. 7, 1999, now abandoned.

(60) Provisional application No. 60/095,637, filed on Aug. 7, 1998.

(51) Int. Cl.
*G06F 9/46* (2006.01)
*G06F 9/48* (2006.01)
*G06F 9/50* (2006.01)
*G06F 9/54* (2006.01)

(52) U.S. Cl. .................. 718/102; 718/103; 719/318

(58) Field of Classification Search ............... 719/318; 718/101–103
See application file for complete search history.

(56) References Cited

U.S. PATENT DOCUMENTS

| | | | |
|---|---|---|---|
| 4,800,521 A | 1/1989 | Carter et al. | |
| 5,247,677 A | 9/1993 | Welland et al. | |
| 5,260,868 A | 11/1993 | Gupta et al. | |
| 5,301,312 A | 4/1994 | Christopher et al. | |
| 5,465,335 A | 11/1995 | Anderson | |
| 5,530,879 A | 6/1996 | Crump et al. | |
| 5,619,409 A | 4/1997 | Schultz et al. | |
| 5,636,124 A | 6/1997 | Rischar et al. | |
| 5,640,563 A | 6/1997 | Carmon | |
| 5,701,481 A | 12/1997 | Hosaka et al. | |
| 5,781,187 A | 7/1998 | Gephardt et al. | |
| 5,872,909 A | 2/1999 | Wilner et al. | |
| 5,938,708 A | 8/1999 | Wallace et al. | |
| 5,944,840 A | 8/1999 | Lever | |
| 5,954,792 A * | 9/1999 | Balarin | 718/102 |
| 6,061,709 A * | 5/2000 | Bronte | 718/103 |
| 6,105,048 A | 8/2000 | He | |
| 6,279,108 B1 | 8/2001 | Squires et al. | |
| 6,341,303 B1 | 1/2002 | Rhee et al. | |
| 6,349,321 B1 | 2/2002 | Katayama | |
| 6,359,622 B1 | 3/2002 | Hayes-Roth | |
| 6,385,637 B1 | 5/2002 | Peters et al. | |
| 6,385,638 B1 | 5/2002 | Baker-Harvey | |
| 6,425,091 B1 | 7/2002 | Yang et al. | |
| 6,434,590 B1 * | 8/2002 | Blelloch et al. | 718/102 |
| 6,438,573 B1 | 8/2002 | Nilsen | |

OTHER PUBLICATIONS

Kevin Jeffay and Charles U. Martel, "On Non-Preemptive Scheduling of Periodic and Sporadic Tasks," Dec. 1991, IEEE Computer Society Press, pp. 129-139.*

(Continued)

*Primary Examiner*—Li B Zhen
(74) *Attorney, Agent, or Firm*—Ropes & Gray LLP

(57) ABSTRACT

Method, computer program, system and apparatus for operating system dynamic event management and task scheduling using function calls. Method, computer program product, and system for non-preemptively scheduling tasks in a computer system. Scheduler and scheduling method that schedules tasks that are broken into a number of short actions, without preempting the actions as they are executed and without assigning a priority to tasks. Invention decreases the overhead as compared to existing methods and systems.

13 Claims, 8 Drawing Sheets

OTHER PUBLICATIONS

Deshpande, et al., "The Shift Programming Language for Dynamic Networks of Hybrid Automata", *IEEE Transactions on Automatic Control*, Apr. 1998, 43(4): 584-587.

Deshpande, et al., "Viable Control of Hybrid Systems", *Hybrid Systems II*, Springer 1995.

Interrupt Driven Task Scheduler for Systems, *IBM Technical Disclosure Bulletin*, Mar. 1992, US.

* cited by examiner

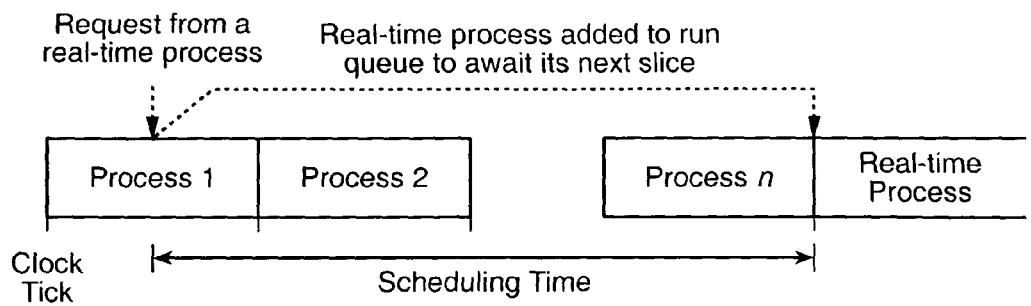
Round-robin Preemptive Scheduler   *FIG._1A*
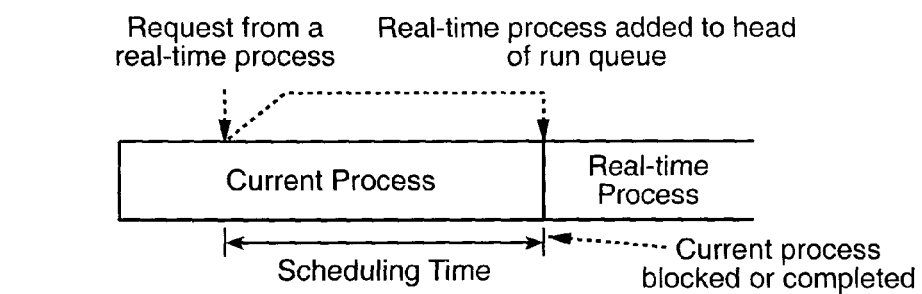
Priority-driven Nonpreemptive Scheduler   *FIG._1B*
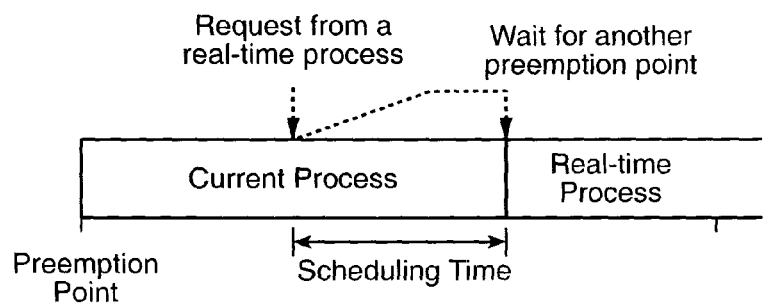
Priority-drive, Preemptive Scheduler on Preemption Points   *FIG._1C*
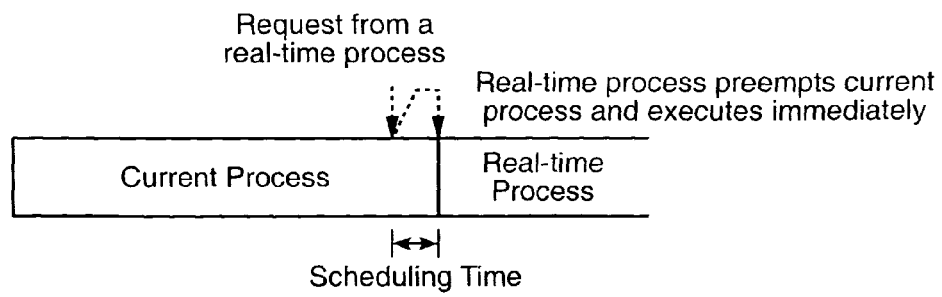
Immediate Preemptive Scheduler   *FIG._1D*

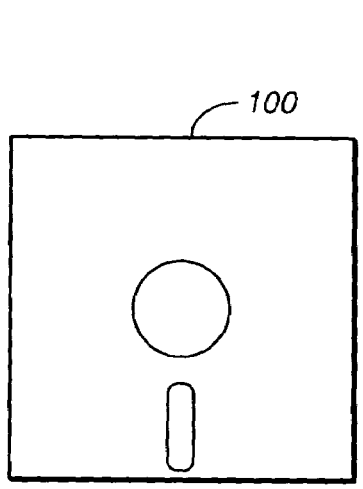
FIG._2A
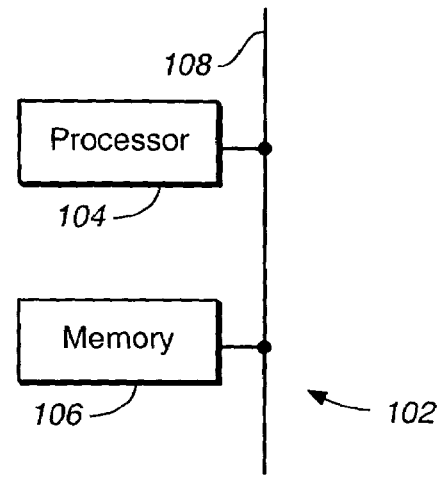
FIG._2B
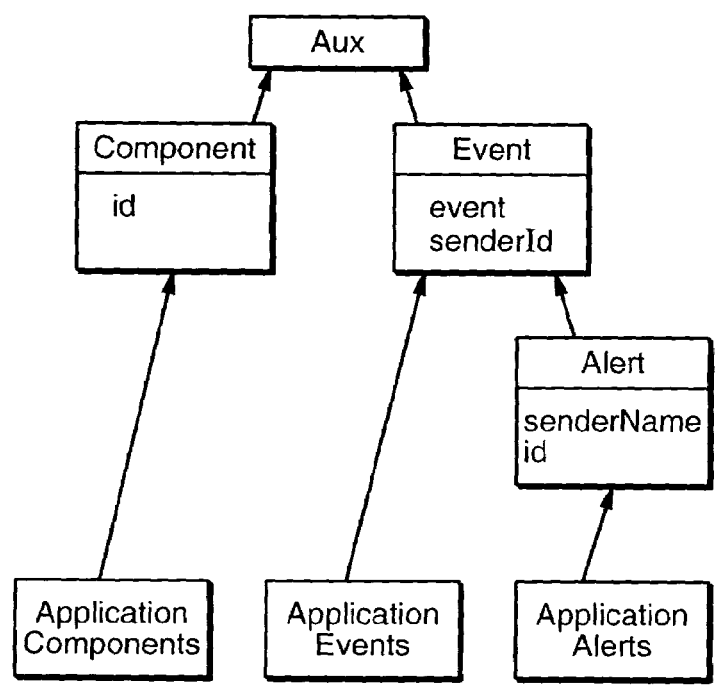
FIG._3

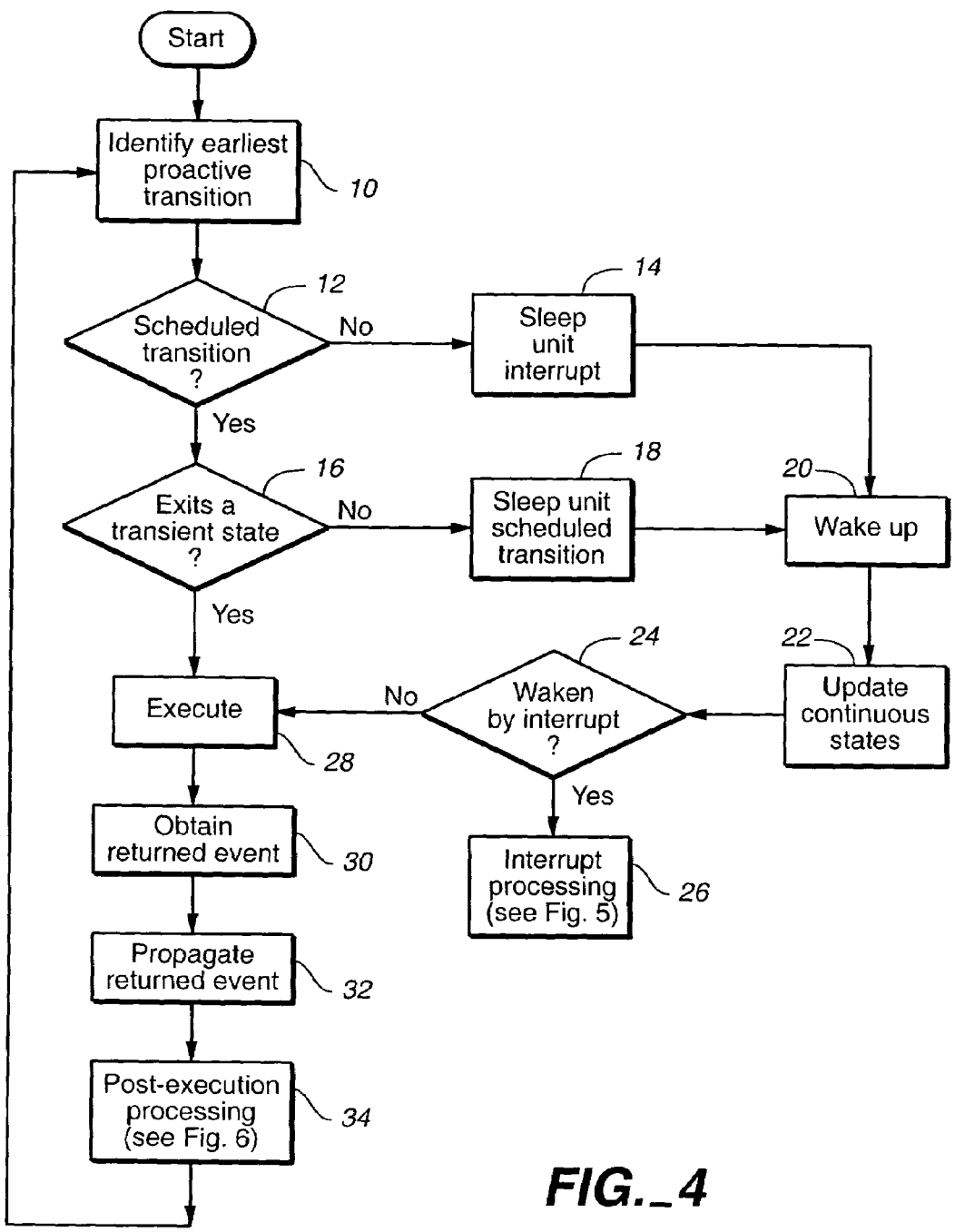
FIG._4

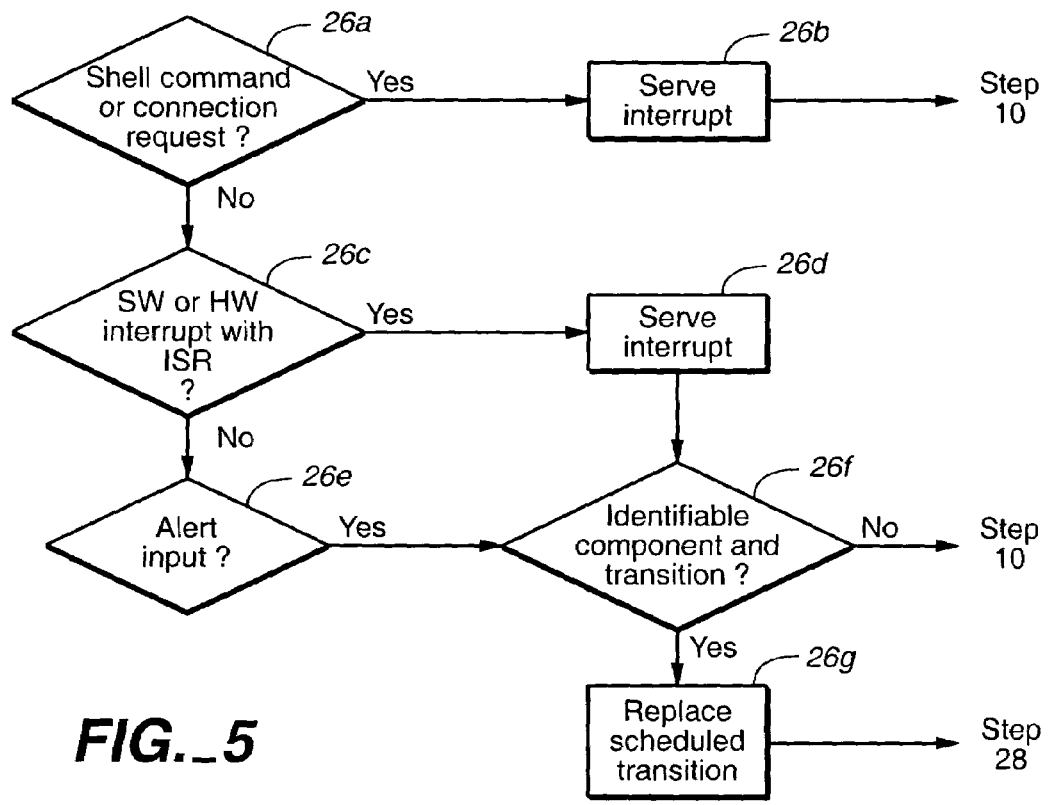
FIG._5
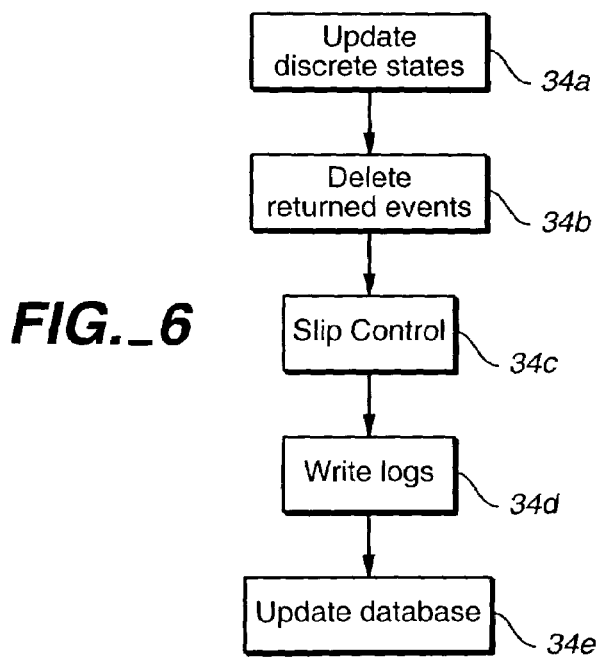
FIG._6

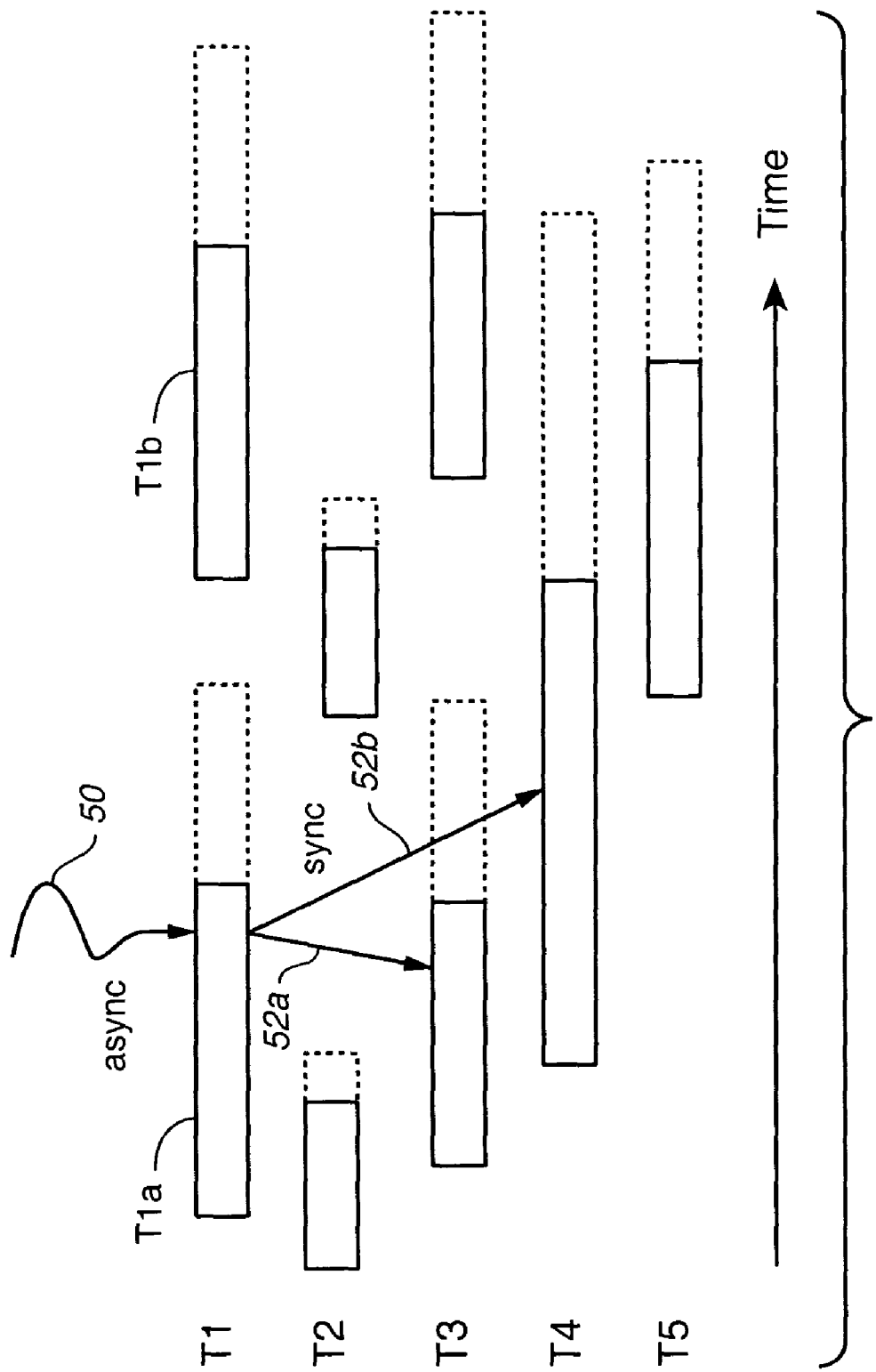
FIG._7

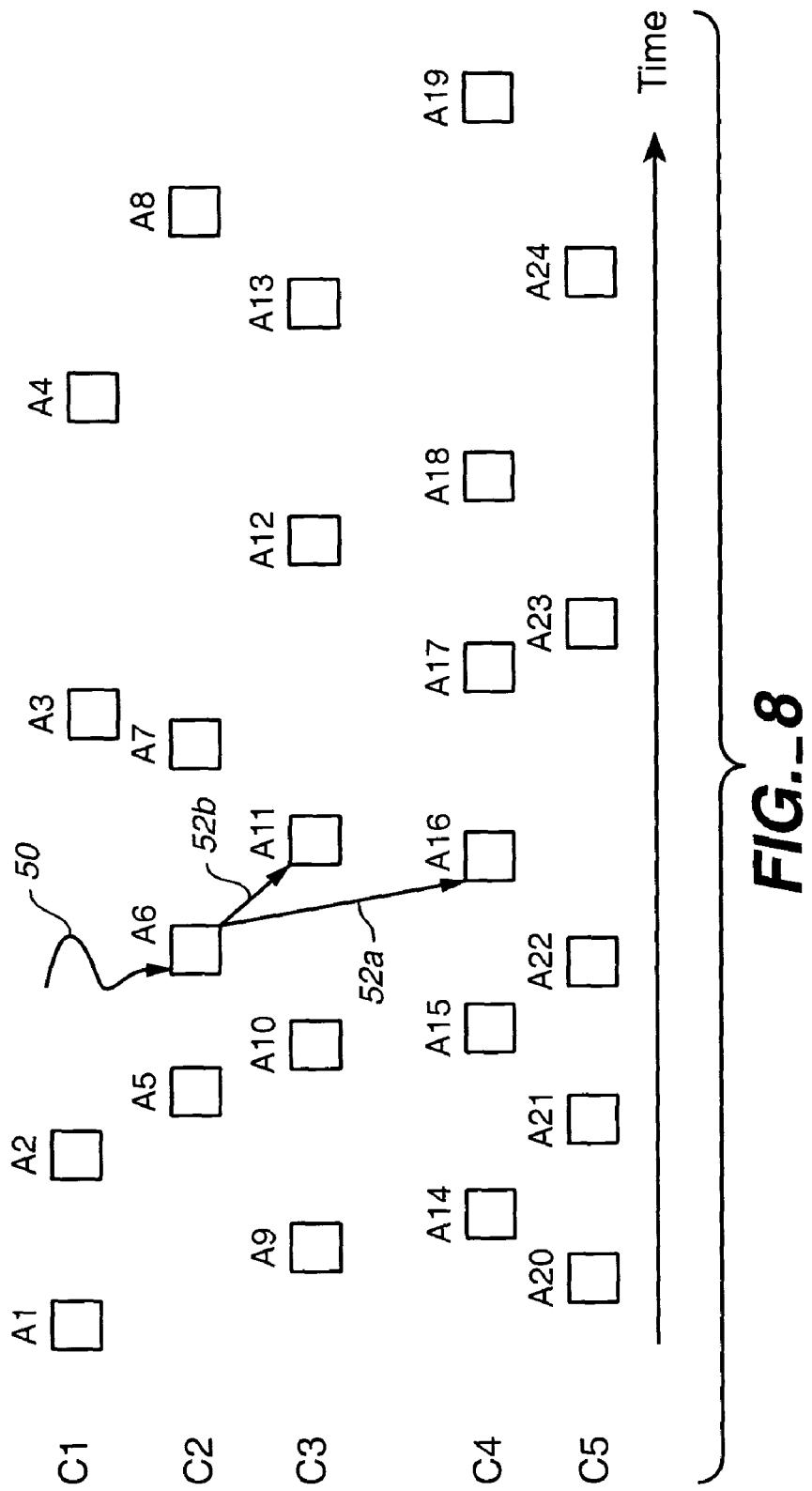
FIG._8

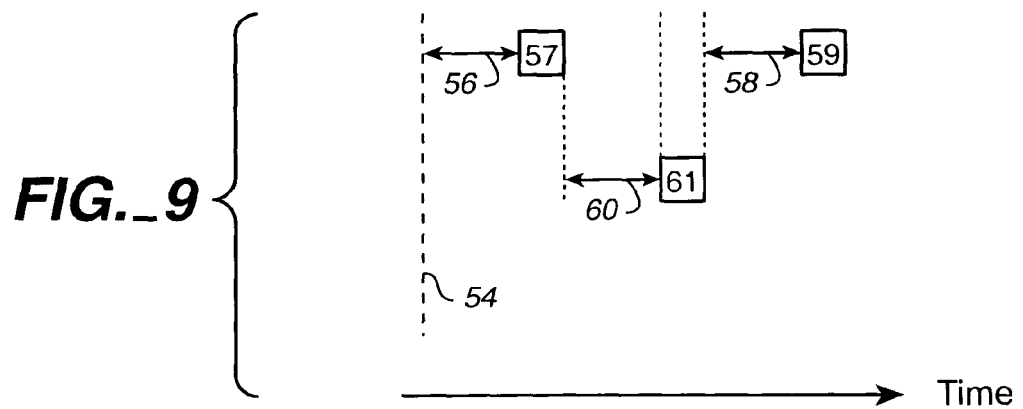
FIG._9
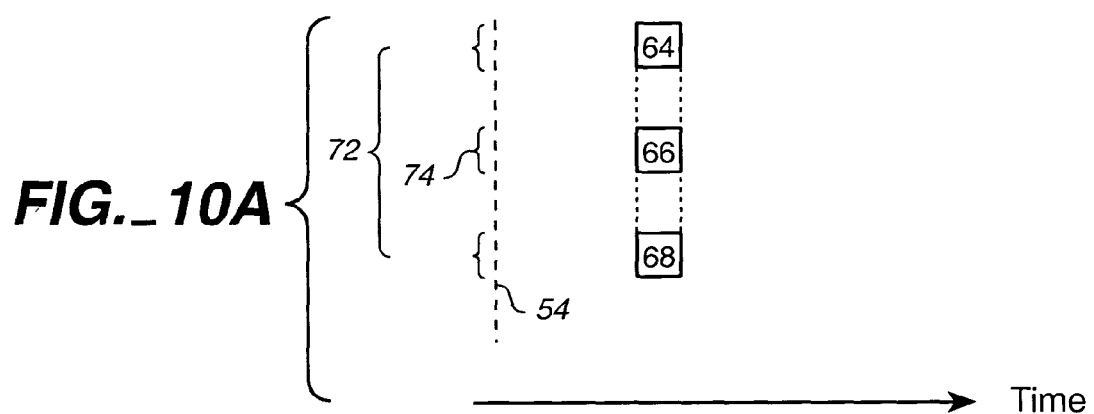
FIG._10A
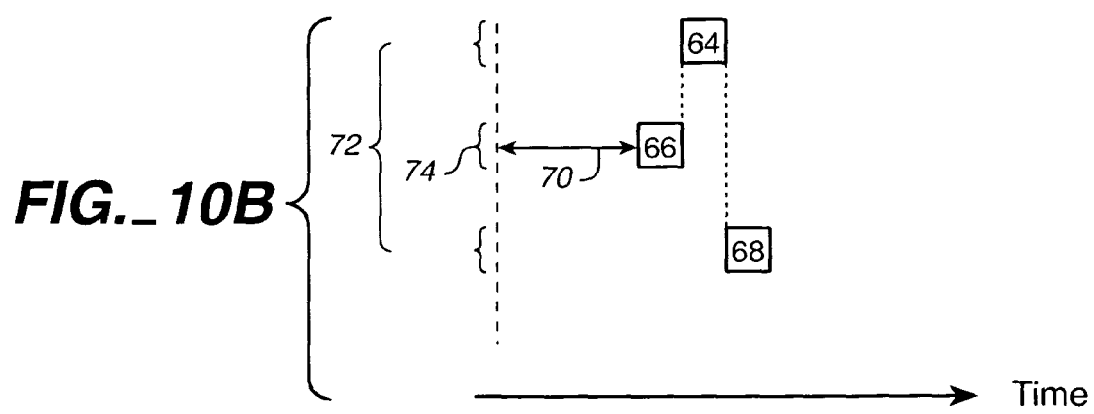
FIG._10B

METHOD, COMPUTER PROGRAM AND APPARATUS FOR OPERATING SYSTEM DYNAMIC EVENT MANAGEMENT AND TASK SCHEDULING USING FUNCTION CALLS

CROSS-REFERENCE TO RELATED APPLICATIONS

This application is a continuation of and claims the benefit of priority to U.S. Utility patent application Ser. No. 09/370,618 filed Aug. 7, 1999; this application is also related to and claims the benefit of U.S. Provisional Application No. 60/095,637 filed Aug. 7, 1998; each of which applications are incorporated by reference in their entirety.

BACKGROUND OF THE INVENTION

1. Field of the Invention

The present invention relates to task schedulers in operating systems for computing devices. In particular, the invention relates to schedulers for real-time operating systems.

2. Description of the Related Art

Real-time computing is becoming an increasingly important discipline. The operating system, and in particular the scheduler, is perhaps the most important component of a real-time system. Examples of current applications of real-time systems include control of laboratory experiments, process control plants, robotics, air traffic control, telecommunications, and military command and control systems. See generally William Stallings, OPERATING SYSTEMS: INTERNALS AND DESIGN PRINCIPLES 10-21, 129-32, 145-59, 384-99, 429-47 (3d ed. 1998) (hereinafter "Stallings").

Scheduling in General

Before discussing, real-time scheduling, an introduction to scheduling algorithms for non-real-time systems will be given. The scheduling algorithms may be preemptive or nonpreemptive. According to Stallings, a nonpreemptive algorithm is when a running process continues to execute until it terminates or blocks itself to wait for I/O or by requesting some operating system service. A preemptive algorithm is when a running process that is currently executing may be interrupted and moved to the ready state by the operating system. The decision to preempt may be performed when a new process arrives, when an interrupt occurs that places a blocked process in the ready state, or periodically based on a clock interrupt.

Stallings also states that a scheduling algorithm may also include prioritization. Each process is assigned a priority and the scheduler will always choose a process of higher priority over one of lower priority. Such a scheme may be implemented with a number of ready queues, one for each priority level. When a process is ready it is placed in the appropriate queue. When the highest priority queue is empty the scheduler selects from the next highest priority queue.

Stallings lists six general types of scheduling algorithms: first-come first-served (FCFS), round robin, shortest process next (SPN), shortest remaining time (SRT), highest response ratio next (HRRN), and feedback.

The FCFS algorithm selects the process that has been waiting the longest for service as the next process. This may also be referred to as first-in, first-out. As each process becomes ready it is placed in the ready queue, and the oldest is selected when the system has completed the previous process. Stallings states that FCFS performs better for long processes than short ones, and that it tends to favor processor-bound processes over I/O-bound processes. Stallings states that an improved FCFS may be implemented with a priority scheme, with a number of priority levels and a ready queue for each priority level.

The round robin algorithm uses clocked preemption. The clock periodically generates an interrupt, upon which the currently running process is placed in the ready queue and the next ready process is selected on an FCFS basis. This may also be referred to as time slicing because each process is given a slice of time before being preempted. Stallings states that the principal design issue is the length of the time quantum, or slice, to be used. If the quantum is very short, then short processes will move through the system relatively quickly. On the other hand, there is processing overhead involved in handling the clock interrupt and in performing the scheduling and dispatching function. (More detail regarding this overhead is discussed below with reference to context switching.) Thus, Stallings concludes that very short time quanta should be avoided. Stallings states that one useful guide is that the time quantum should be slightly greater than the time required for a typical interaction. Stallings further states that a disadvantage to round robin is that processor-bound processes tend to receive an unfair portion of processor time as compared to I/O-bound processes.

The SPN algorithm is a nonpreemptive policy in which the process with the shortest expected processing time is selected next. One concern is that the required processing time of each process must be known or estimated.

The SRT algorithm is a preemptive version of SPN. If a new process joins the ready queue with a shorter known or expected completion time than the currently-executing process, the current process preempted and exchanged with the new process in the ready queue.

In HRRN, a response ratio is dynamically calculated for each process, and when the current process completes or is blocked, the ready process with the greatest response ratio value is selected as the next process to execute. The response ratio is the time the process has been waiting plus its known or estimated processing time, divided by the known or estimated processing time.

In feedback, the current process is interrupted periodically and is assigned to a lower priority queue. This results in a preference for newer, shorter processes, without having to know or estimate their processing times beforehand. The interrupt interval may be set longer for lower priority queues to help prevent starvation of a very long process. In addition, the priority of a process may be upgraded if it has not been executed for a while.

As mentioned above, whenever one process replaces another to be executed, a process switch (also called a context switch) is executed. Stallings states that in a process switch the operating system must make substantial changes in its environment, as follows. First, the context of the processor must be saved, including the program counter and other registers. Second, the process control block of the currently-running process must be updated, including changing the state of the process to another state and changing state information fields. Third, the process control block of this process must be moved to an appropriate other queue, such as the ready queue or the blocked queue. Fourth, another process must be selected and scheduled. Fifth, the process control block of the selected process must be updated. Sixth, the memory-management data structures may need to be updated, depending upon how address translation is managed. Seventh, the context of the processor must be restored to that which existed at the time the selected process was last switched out of the running state. Performing these changes requires overhead time, during which the processor cannot be used for running processes.

Real-Time Scheduling

Turning now to real-time scheduling, Stallings states that real-time computing may be defined as that type of computing in which the correctness of the system depends not only on the logical result of the computation, but also on the time at which the results are produced. We can define a real-time system by defining what is meant by a real-time process, or task. (As usual, terminology poses a problem, since various words are used in the literature with varying meanings. It is common for a particular process to operate under real-time constraints of a repetitive nature. That is, the process lasts for a long time and, during that time, performs some repetitive function in response to real-time events. Let us, for this section, refer to an individual function as a task. Thus, the process can be viewed as progressing through a sequence of tasks. At any given time, the process is engaged in a single task, and it is the process/task that must be scheduled.) In general, in a real-time system, some of the tasks are real-time tasks, and these have a certain degree of urgency to them. Such tasks are attempting to control or react to events that take place in the outside world. Because these events occur in "real time," a real-time task must be able to keep up with the events with which it is concerned. Thus, it is usually possible to associate a deadline with a particular task, where the deadline specifies either a start time or a completion time. Such a task may be classified as hard or soft. A hard real-time task is one that must meet its deadline; otherwise it will cause undesirable damage or a fatal error to the system. A soft real-time task has an associated deadline that is desirable but not mandatory; it still makes sense to schedule and complete the task even if it has passed its deadline.

Stallings further states that another characteristic of real-time tasks is whether they are periodic or aperiodic. An aperiodic task has a deadline by which it must finish or start, or it may have a constraint on both start and finish time. In the case of a periodic task, the requirement may be stated as "once per period T" or "exactly T units apart."

Characteristics of Real-Time Operating Systems

Stallings states that real-time operating systems can be characterized as having unique requirements in five general areas: determinism, responsiveness, user control, reliability, and fail-soft operation.

Stallings states that an operating system is deterministic to the extent that it performs operations at fixed, predetermined times or within predetermined time intervals. When multiple processes are competing for resources and processor time, no system will be fully deterministic. In a real-time operating system, process requests for service are dictated by external events and timings. The extent to which an operating system can deterministically satisfy requests depends first on the speed with which it can respond to interrupts and, second, on whether the system has sufficient capacity to handle all requests within the required time.

Stallings further states that one useful measure of the ability of an operating system to function deterministically is the maximum delay from the arrival of a high-priority device interrupt to when servicing begins. In non-real-time operating systems, this delay may be in the range of tens to hundreds of milliseconds, while in real-time operating systems that delay may have an upper bound of anywhere from a few microseconds to a millisecond.

Stallings also states that a related but distinct characteristic is responsiveness. Determinism is concerned with how long an operating system delays before acknowledging an interrupt. Responsiveness is concerned with how long, after acknowledgment, it takes an operating system to service the interrupt. Aspects of responsiveness include the following:

1. The amount of time required to initially handle the interrupt and begin execution of the interrupt service routine (ISR). If execution of the ISR requires a process switch, then the delay will be longer than if the ISR can be executed within the context of the current process.

2. The amount of time required to perform the ISR. This generally is dependent upon the hardware platform.

3. The effect of interrupt nesting. If an ISR can be interrupted by the arrival of another interrupt, then the service will be delayed.

Stallings still further states that determinism and responsiveness together make up the response time to external events. Response time requirements are critical for real-time systems, because such systems must meet timing requirements imposed by individuals, devices, and data flows external to the system.

Stallings states that user control is generally much broader in a real-time operating system than in ordinary operating systems. In a real-time system, it is essential to allow the user fine-grained control over task priority. The user should be able to distinguish between hard and soft tasks and to specify relative priorities within each class. A real-time system may also allow the user to specify such characteristics as the use of paging or process swapping, what processes must always be resident in main memory, what disk transfer algorithms are to be used, what rights the processes in various priority bands have, and so on.

Stallings also states that reliability is typically far more important for real-time systems than non-real-time systems.

Stallings further states that fail-soft operation is a characteristic that refers to the capability of a system to fail in such a way as to preserve as much capability and data as possible. When a real-time system detects a failure, it will attempt either to correct the problem or minimize its effects while continuing to run. A related concept is stability, which means that in cases where it is impossible to meet all task deadlines, the system will meet the deadlines of its most critical, highest-priority tasks, even it some less critical task deadlines are not always met.

Stallings states that current real-time systems typically include the following features:

1. Fast process or thread switch
2. Small size (with its associated minimal functionality)
3. Ability to respond to external interrupts quickly
4. Multitasking with interprocess communication tools such as semaphores, signals, and events
5. Use of special sequential files that can accumulate data at a fast rate
6. Preemptive scheduling based on priority
7. Minimization of intervals during which interrupts are disabled
8. Primitives to delay tasks for a fixed amount of time and to pause/resume tasks
9. Special alarms and timeouts.

Stallings asserts that the heart of a real-time system is the short-term task scheduler. In designing such a scheduler, fairness and minimizing average response time are not important. What is important is that all hard real-time tasks complete (or start) by their deadline and that as many as possible soft real-time tasks also complete (or start) by their deadline.

Stallings states that most contemporary real-time operating systems are unable to deal directly with deadlines.

Instead, they are designed to be as responsive as possible to real-time tasks so that when a deadline approaches, a task can be quickly scheduled. From this point of view, real-time applications typically require deterministic response times in the several-millisecond to submillisecond span under a broad set of conditions; leading-edge applications—in simulators for military aircraft, for example—often have constraints in the range of 10 to 100 μs.

Stallings provides the following description with reference to FIGS. 1A-1D to illustrate a spectrum of possibilities. In a preemptive scheduler that uses simple round-robin scheduling, a real-time task would be added to the ready queue to await its next time slice, as illustrated in FIG. 1A. In this case, the scheduling time will generally be unacceptable for real-time applications. Alternatively, in a nonpreemptive scheduler, we could use a priority scheduling mechanism, giving real-time tasks higher priority. In this case, a real-time task that is ready would be scheduled as soon as the current process blocks or runs to completion (see FIG. 1B). This could lead to a delay of several seconds if a slow, low-priority task were executing at a critical time. Again, this approach is not acceptable. A more promising approach is to combine priorities with clock-based interrupts. Preemption points occur at regular intervals. When a preemption point occurs, the currently running task is preempted if a higher-priority task is waiting. This would include the preemption of tasks that are part of the operating system kernel. Such a delay may be on the order of several milliseconds (see FIG. 1C). While this last approach may be adequate for some real-time applications, it will not suffice for more demanding applications. In those cases, the approach that has been taken is sometimes referred to as immediate preemption (see FIG. 1D). In this case, the operating system responds to an interrupt almost immediately, unless the system is in a critical-code lockout section. Scheduling delays for a real-time task can then be reduced to 100 μs or less.

Stallings reports that a survey of real-time scheduling algorithms observes that the various scheduling approaches depend on (1) whether a system performs schedulability analysis, (2) if it does, whether it is done statically or dynamically, and (3) whether the result of the analysis itself produces a schedule or plan according to which tasks are dispatched at run time. Based on these considerations, the survey identifies the following classes of algorithms:

1. Static table-driven approaches: These perform a static analysis of feasible schedules of dispatching. The result of the analysis is a schedule that determines, at run time, when a task must begin execution.

2. Static priority-driven preemptive approaches: Again, a static analysis is performed, but no schedule is drawn up. Rather, the analysis is used to assign priorities to tasks, so that a traditional priority-driven preemptive scheduler can be used.

3. Dynamic planning-based approaches: Feasibility is determined at run time (dynamically) rather than offline prior to the start of execution (statically). An arriving task is accepted for execution only if it is feasible to meet its time constraints. One of the results of the feasibility analysis is a schedule or plan that is used to decide when to dispatch this task.

4. Dynamic best effort approaches: No feasibility analysis is performed. The system tries to meet all deadlines and aborts any started process whose deadline is missed.

Stallings states that static table-driven scheduling is applicable to tasks that are periodic. Input to the analysis consists of the periodic arrival time, execution time, period ending deadline, and relative priority of each task. The scheduler attempts to develop a schedule that enables it to meet the requirements of all periodic tasks. This is a predictable approach but one that is inflexible, because any change to any task requirements requires that the schedule be redone. Earliest-deadline-first or other periodic deadline techniques (discussed later) are typical of this category of scheduling algorithms.

Stallings further states that static priority-driven preemptive scheduling makes use of the priority-driven preemptive scheduling mechanism common to most non-real-time multiprogramming systems. In a non-real-time system, a variety of factors might be used to determine priority. For example, in a time-sharing system, the priority of a process changes depending on whether it is processor bound or I/O bound. In a real-time system, priority assignment is related to the time constraints associated with each task. One example of this approach is the rate monotonic algorithm (discussed later), which assigns static priorities to tasks based on their periods.

Stallings yet further states that with dynamic planning-based scheduling, after a task arrives, but before its execution begins, an attempt is made to create a schedule that contains the previously scheduled tasks as well as the new arrival. If the new arrival can be scheduled in such a way that its deadlines are satisfied and that no currently scheduled task misses a deadline, then the schedule is revised to accommodate the new task.

Stallings also states that dynamic best effort scheduling is the approach used by many real-time systems that are currently commercially available. When a task arrives, the system assigns a priority based on the characteristics of the task. Some form of deadline scheduling, such as earliest-deadline scheduling, is typically used. Typically, the tasks are aperiodic and so no static scheduling analysis is possible. With this type of scheduling, until a deadline arrives or until the task completes, we do not know whether a timing constraint will be met. This is the major disadvantage of this form of scheduling. Its advantage is that it is easy to implement.

Stallings reports that two popular classes of real-time scheduling algorithms are deadline scheduling and rate monotonic scheduling.

Deadline Scheduling

Stallings states that most contemporary real-time operating systems are designed with the objective of starting real-time tasks as rapidly as possible, and hence emphasize rapid interrupt handling and task dispatching. In fact, this is not a particularly useful metric in evaluating real-time operating systems. Real-time applications are generally not concerned with sheer speed but rather with completing (or starting) tasks at the most valuable times, neither too early nor too late, despite dynamic resource demands and conflicts, processing overloads, and hardware or software faults. It follows that priorities provide a crude tool and do not capture the requirement of completion (or initiation) at the most valuable time.

Stallings reports that in recent years, there have been a number of proposals for more powerful and appropriate approaches to real-time task scheduling. All of these are based on having additional information about each task. In its most general form, the following information about each task might be used:

1. Ready time: Time at which task becomes ready for execution. In the case of a repetitive or periodic task, this is actually a sequence of times that is known in advance. In the case of an aperiodic task, this time may be known in advance, or the operating system may only be aware when the task is actually ready.

2. Starting deadline: Time by which a task must begin.

3. Completion deadline: Time by which task must be completed. The typical real-time application will either have starting deadlines or completion dead-lines, but not both.

4. Processing time: Time required to execute the task to completion. In some cases, this is supplied. In others, the operating system measures an exponential average. For still other scheduling systems, this information is not used.

5. Resource requirements: Set of resources (other than the processor) required by the task while it is executing.

6. Priority: Measures relative importance of the task. Hard real-time tasks may have an "absolute" priority, with the system failing if a deadline is missed. If the system is to continue to run no matter what, then both hard and soft real—time tasks may be assigned relative priorities as a guide to the scheduler.

7. Subtask structure: A task may be decomposed into a mandatory subtask and an optional subtask. Only the mandatory subtask possesses a hard deadline.

Stallings further states that there are several dimensions to the real-time scheduling function when deadlines are taken into account: which task to schedule next, and what sort of preemption is allowed. It can be shown, for a given preemption strategy and using either starting or completion deadlines, that a policy of scheduling the task with the earliest deadline minimizes the fraction of tasks that miss their deadlines. This conclusion holds both for single processor and multiprocessor configurations.

Stallings asserts that the other critical design issue is that of preemption. When starting deadlines are specified, then a nonpreemptive scheduler makes sense. In this case, it would be the responsibility of the real-time task to block itself after completing the mandatory or critical portion of its execution, allowing other real-time starting deadlines to be satisfied. This fits the pattern of FIG. 1B. For a system with completion deadlines, a preemptive strategy (FIG. 1C or 1D) is most appropriate. For example, if task X is running and task Y is ready, there may be circumstances in which the only way to allow both X and Y to meet their completion deadlines is to preempt X, execute Y to completion, and then resume X to completion.

Stallings states that a straightforward scheme is always to schedule the ready task with earliest deadline and let that task run to completion. When this approach is used, when a new task requires immediate service, the service is denied. This is the risk in dealing with aperiodic tasks, especially with starting deadlines. A refinement of the policy will improve performance if deadlines can be known in advance of the time that a task is ready. This policy, referred to as earliest deadline with unforced idle times, operates as follows: Always schedule the eligible task with the earliest deadline and let that task run to completion. An eligible task may not be ready, and this may result in the processor remaining idle even though there are ready tasks. The result is that, even though the processor is not used to maximum efficiency, all scheduling requirements are met.

Rate Monotonic Scheduling

Stallings states that one of the more promising methods of resolving multitask scheduling conflicts for periodic tasks is rate monotonic scheduling (RMS). The scheme was first proposed in 1973 but has only recently gained popularity. RMS assigns priorities to tasks on the basis of their periods.

Stallings further states that in RMS, the task's period T is the amount of time between the arrival of one instance of the task and the arrival of the next instance of the task. A task's rate (in Hertz) is simply the inverse of its period (in seconds). Typically, the end of a task's period is also the task's hard deadline, although some tasks may have earlier deadlines. The execution (or computation) time C is the amount of processing time required for each occurrence of the task. It should be clear that in a uniprocessor system, the execution time must be no greater than the period (must have $C \leqq T$). If a periodic task is always run to completion—that is, if no instance of the task is ever denied service because of insufficient resources—then the utilization of the processor by this task is $U=C/T$.

Stallings also states that for RMS, the highest-priority task is the one with the shortest period, the second highest-priority task is the one with the second shortest period, and so on. When more than one task is available for execution, the one with the shortest period is serviced first. If we plot the priority of tasks as a function of their rate, the result is a monotonically increasing function; hence the name, rate monotonic scheduling.

Stallings still further states that it is possible to achieve greater overall processor utilization and therefore accommodate more periodic tasks with earliest deadline scheduling than with RMS. Nevertheless, RMS has been widely adopted for use in industrial applications, for the following reasons:

1. The performance difference is small in practice, where a utilization as high as 90% is often achieved.

2. Most hard real-time systems also have soft real-time components, such as certain noncritical displays and built-in self-tests that can execute at lower priority levels to absorb the processor time that is not used with RMS scheduling of hard real-time tasks.

3. Stability is easier to achieve with RMS. When a system cannot meet all deadlines because of overload or transient errors, the deadlines of essential tasks need to be guaranteed provided that this subset of tasks is schedulable. In a static priority assignment approach, one only needs to ensure that essential tasks have relatively high priorities. This can be done in RMS by structuring essential tasks to have short periods or by modifying the RMS priorities to account for essential tasks. With earliest deadline scheduling, a periodic task's priority changes from one period to another. This makes it more difficult to ensure that essential tasks meet their deadlines.

The SHIFT Programming Language

The SHIFT programming language is used for describing and simulating dynamic networks of hybrid automata. See generally Akash Deshpande, Aleks Gollu and Luigi Semenzato, *The Shift Programming Language for Dynamic Networks of Hybrid Systems*, IEEE TRANSACTIONS ON AUTOMATIC CONTROL (Special Issue on Hybrid Systems, April 1998). Such systems consist of components which can be created, interconnected and destroyed as the system evolves. Components exhibit hybrid behavior: continuous-time phases separated by instantaneous discrete-event transitions. Components may evolve independently, or they may interact through selected state variables and events. The interaction network itself may evolve. However, the SHIFT programming language is a simulation engine, and lacks a real-time scheduler.

Concerns with the Existing Art

Given the above state of the art, both for simulation and for real-time schedulers, a number of concerns exist. Each time a task is preempted to allow another task to run, the scheduler has to switch contexts, which includes saving all processor registers, loading them for the new task, paging tasks in and out, etc. These context switches are overhead that introduce inefficiency in the execution.

Further, practical implementations of task schedulers in operating systems limit the simultaneous execution of tasks to some relatively small number (200-300). This reduces the scale of the application.

To reduce the overhead, it is known that function calls are cheaper in terms of system resource usage than context switching. This suggests that function calls may be used in place of context switches. But the problem is that function calls are nonpreemptive. That is, once a function starts, it cannot be interrupted until it is completed. (On the other hand, task scheduling is preemptive—tasks can be interrupted at any point to allow other tasks to run.) Being nonpreemptive, if a long function is being executed, it will delay other functions that are waiting to be executed, possibly violating their real-time deadlines. Due to this major drawback, function calls are not presently used for context switching.

SUMMARY OF THE INVENTION

The present invention addresses these and other problems of the prior art by scheduling a number of short actions of a task non-preemptively and executing them as functions.

According to one embodiment, a method according to the present invention schedules tasks to be performed by a computing device. The method includes the steps of storing a plurality of components, each component having an identification value and a scheduled start time and including one or more short actions, the one or more short actions having at least one relationship therebetween; identifying an earliest one of the one or more short actions of an earliest one of the plurality of components, in accordance with the scheduled start time; executing the identified earliest action; obtaining a returned event in accordance with the step of executing; and propagating the returned event to one or more other actions in accordance with the at least one relationship.

According to another embodiment, a computer-readable program code according to the present invention is embodied on a computer-readable medium and schedules tasks to be performed by a computing device. The computer-readable program code comprises a computer-readable program storage code configured to store a plurality of components, each component having an identification value and a scheduled start time and including one or more short actions, the one or more short actions having at least one relationship therebetween; a computer-readable program identification code configured to identify an earliest one of the one or more short actions of an earliest one of the plurality of components, in accordance with the scheduled start time; a computer-readable program execution code configured to execute the identified earliest action; a computer-readable program obtaining code configured to obtain a returned event in accordance with the execution code; and a computer-readable program propagation code configured to propagate the returned event to one or more other actions in accordance with the at least one relationship.

According to still another embodiment, an apparatus according to the present invention includes a circuit for scheduling tasks to be performed by a computing device. The apparatus comprises a processor circuit configured to process instructions and data; and a memory circuit, coupled to the processor circuit, the memory circuit configured to store a computer-readable program code, the computer-readable program code comprising said instructions and data and configured to operate with said processor circuit. The computer-readable program code includes: a computer-readable program storage code configured to store a plurality of components, each component having an identification value and a scheduled start time and including one or more short actions, the one or more short actions having at least one relationship therebetween; a computer-readable program identification code configured to identify an earliest one of the one or more short actions of an earliest one of the plurality of components, in accordance with the scheduled start time; a computer-readable program execution code configured to execute the identified earliest action; a computer-readable program obtaining code configured to obtain a returned event in accordance with operation of the execution code; and a computer-readable program propagation code configured to propagate the returned event to one or more other actions in accordance with the at least one relationship.

A better understanding of the features and advantages of the present invention will be obtained by reference to the following detailed description and accompanying drawings which set forth illustrative embodiments in which the principles of the invention are utilized.

BRIEF DESCRIPTION OF THE DRAWINGS

FIGS. 1A-1D are timing diagrams showing a scheduling time for various scheduling algorithms.

FIG. 2A is a plan view of a storage medium such as a magnetic (floppy) disk or CD-ROM containing an embodiment of a computer program according to the present invention.

FIG. 2B is a block diagram of a circuit according to an embodiment of the present invention.

FIG. 3 is a block diagram showing the relationship between alerts, events and components in an embodiment of the present invention.

FIG. 4 is a flowchart of a scheduling process according to an embodiment of the present invention.

FIG. 5 is a flowchart of interrupt processing performed in FIG. 4.

FIG. 6 is a flowchart of post-execution processing performed in FIG. 4.

FIG. 7 is a timing diagram showing an example of an existing task scheduling process.

FIG. 8 is a timing diagram showing an example of unscheduled tasks that are scheduled according to an embodiment of the present invention.

FIG. 9 is a timing diagram showing an example of task scheduling and execution according to the scheduling process of FIG. 4.

FIGS. 10A-10B are timing diagrams showing another example of task scheduling and execution according to the scheduling process of FIG. 4.

DETAILED DESCRIPTION OF THE PREFERRED EMBODIMENTS

Figure 11A:
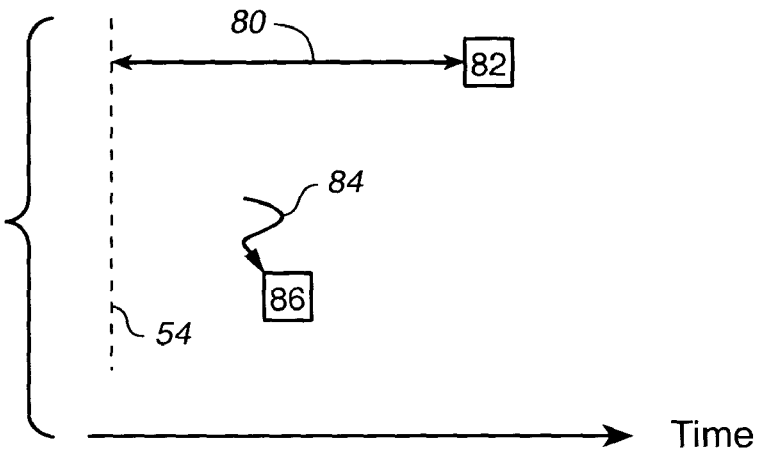
FIGS. 11A-11B are timing diagrams showing yet another example of task scheduling and execution according to the scheduling process of FIG. 4.

A preferred embodiment of the present invention is implemented in C++ programming language as part of the Teja™ real-time computing environment from Teja Technologies Inc., Richmond, Calif. The present invention is directed toward a scheduler for the Teja™ computing environment. FIG. 2A shows that object or executable code corresponding to software implementing the scheduler may be embodied on a computer-readable medium such as a floppy disk 100 or CD-ROM.

FIG. 2B shows that the scheduler may be implemented as part of a system-on-a-chip 102. System 102 includes a processor circuit 104 (which has an internal timer circuit) and a memory circuit 106. A bus 108 interconnects these components and provides connections to other components such as I/O devices or interfaces. The scheduler software may be stored in memory circuit 106 and executed by processor circuit 104. Processor circuit 104 may also control the other components on system 102.

Although this application uses the terms "hardware" and "software" to refer to the implementation of a preferred embodiment of the present invention, it is contemplated that these specific terms are not required and that the present invention may be implemented in microcode, firmware, etc. as desired.

The following description covers the Teja™ scheduler in the context of the Teja™ model and of the Dynamic Event Management™ model underlying Teja™ components, events, alerts, servers and clients. In addition, a comparison between the Teja™ scheduler and existing schedulers is provided.

1 Basic Concepts

Before discussing the specifics of the Teja™ model and scheduler, the following introductory remarks describe the Teja™ operating environment.

1.1 Components

The Teja™ application is populated by software components. Components are integrated data and process models that execute concurrently in real-time in an event-driven and time-driven manner. They are specified using object-oriented data modeling and hybrid state machine-based process modeling. Components are instances of the application's various component classes.

Components take in data and event inputs and they produce data and event outputs according to their real-time discrete event behavior specification.

Components are similar to Stallings' "processes". A component is divided into one or more short actions by design tools before being operated upon by the scheduler. Actions are similar to Stallings' "tasks" in the sense that both are what is scheduled by the scheduler; however, Stallings' tasks may be preempted. An action can include a number of instructions. Each action is a fine-grained computation that is executed as a function call. Since the function call will take only a short time, even though it is not preemptible, it will possibly delay other actions only by a little bit. The scheduler then browses through the ready functions and schedules them cleverly so they all get done in the order they are required to be executed by the application. Actions and scheduling are further described below in section 6.3 and with reference to FIGS. 4-11B.

Programming an application in terms of short actions is unnatural and is not usually done. A related part of the present invention is a modeling technique and design tools that are at a high level for the programmer to use effectively, but which naturally support this fine-grained programming approach. The design tools generate code that corresponds to the components and actions that is suitable for the scheduler, and the programmer controls the grain of computation. The programmer may also specify which actions in a component are to be executed before other actions in the component. The result of the design tools is a plurality of components, each component having an identification value and one or more short actions, and the actions have at least one relationship between them. Of course, the modeling and design tools are not required for operation of the scheduler. A programmer could generate code in which components are divided into short actions without the design tools. However, the design tools make the programmer's job easier.

1.2 Component Relationships

The application's components are related to each other in a variety of relationships. In the Teja™ model, relationships are modeled as directed binary links between components. Relationships are used for specifying containment hierarchies, connections between components and more complex interactions needed for data flow or event synchronization.

1.3 Distributed Client-Server Architectures

The Teja™ application can consist of multiple application servers, web servers, clients and Common Object Request Broker Architecture (CORBA) connectivity processes. The components reside in application servers and exercise their real-time behavior there, while the non-real-time processing such as user interfacing and web connectivity is performed in the other processes.

Components within a server share memory and time, thereby supporting data flow and synchronous message passing. Different servers share neither memory nor time; they share information through asynchronous message passing.

The Teja™ model provides the application programming interface for making and breaking connections between the different processes and for sending and receiving messages between them.

1.4 Events and Alerts

Components interact with each other through events. Events are data structures describing the information content of messages sent between components. Each event contains the event name and any other data in the message.

The Teja™ model supports synchronous messages called Events and asynchronous messages called Alerts. Events are locally synchronous within the scope of a single server. Alerts are globally asynchronous interrupts between servers. Event synchronization within a server is performed in a multi-cast, cause-effect manner. Alert synchronization across multiple servers is performed in a point-to-point, cause-effect manner.

2 The Component Model

A component is described in terms of its outputs, inputs, states and state transitions. Outputs are of three kinds: variables, links and functions. Inputs are functions that dereference the outputs of linked components. States are of three kinds: continuous states, discrete states and event propagation states. State transitions are of two kinds: continuous flow equations and discrete state transitions.

2.1 Outputs

Outputs constitute the public interface data model of components.

2.1.1 Variables

Variables constitute the computation outputs of the component. They have piecewise constant time traces. Each variable can be of any type supported by C++, such as, for example, char*, int or double, or even a structure or class pointer.

All components have the variable id which is assigned by the Teja™ model when the component is setup. Its value is the unique identification of the component within the server process. The type of id is long int.

2.1.2 Links

Links constitute the relationships of the component with other components. They are unidirectional pointers to components. Links have piecewise constant time traces.

A component can dereference the outputs of the linked component. This constitutes a directed data dependency between the two components. When the value of the link changes, so does the data dependency graph, leading to a dynamically changing network of data dependencies between components.

2.1.3 Functions

Functions constitute the functional interface of the component. They provide abstract interfaces to the component's state information.

2.2 Inputs

Inputs are functions that dereference the outputs of linked components. Thus, inputs model data flow connections. Even though inputs are not necessary for component description, they are provided for enabling modular descriptions of component behaviors.

Inputs constitute a directed data dependency between the two linked components. When the value of the link changes, so does the data dependency graph, leading to a dynamically changing network of data dependencies between components.

2.3 States

States are private members of the component.

2.3.1 Continuous States

Continuous states constitute flow variables. They have piecewise continuous time traces.

For each continuous state, say x, the Teja™ model defines a corresponding rate variable named x_dot. The value of the rate variable gives the rate at which the continuous state is changing.

Each continuous state and each rate variable is represented by the C++ double type.

2.3.2 Discrete States

Discrete states constitute the component's logical modes of operation. They are the nodes of the component's state machine graph. The component's discrete state is represented by the C++ int type.

A discrete state may be marked transient. When a component enters a transient state, the Teja™ model will ensure that the component is forced to exit that state immediately (i.e., without the passage of any time and without the occurrence of any other action in the system, except, possibly, exiting the transient state of another component that has been created earlier).

Each component has the Teja™ model-defined state stop, numbered −1. When a component enters the stop state, it is deleted from the system. No outgoing transitions may be specified for the stop state.

Each component has the Teja™ model-defined state error, numbered 0. If the Teja™ model finds a component in a transient state with no outgoing transition enabled, the Teja™ model will force the component into the error state. Users can program outgoing transitions from the error state to handle the violation of the semantics of transient states. No incoming transitions may be specified for the error state.

The stop state and the error state are transient states.

2.3.3 Event Propagation States

Event propagation states constitute the synchronization dependencies between components. Understanding event propagation states requires an understanding of discrete state transitions described in the next subsection. Event propagation states are described in section 2.5.

2.4 State Transitions

State transitions may be either continuous (called flow equations) or discrete (called transitions).

2.4.1 Flow Equations

Flow equations determine how the component's continuous states change with the passage of time. Each discrete state declares one flow expression for each continuous state. These flow expressions are evaluated at the time the discrete state is entered and the resulting values are assigned to the corresponding rate variables. This leads to a variable time step forward Euler numerical integration of the flow equations. More refined numerical integration is obtained by using output variables with update equations.

2.4.2 Discrete State Transitions

Discrete state transitions determine the logical behavior of the component. Discrete state transitions are simply called transitions. Each transition consists of the following parts.

I. The from state. The discrete state from which the transition originates.

II. The to state. The discrete state into which the transition enters. The to state may also have the special value stop which indicates that the component is ready to be deleted from the system.

III. The input event label. The input event label is a symbol defined in the global scope of the application. It is used for synchronization of propagated events and alerts. Event labels are represented by the C++ enum type.

IV. The transition guard. The transition guard returns the time which must elapse before the transition can be taken.

A. A positive value indicates that the transition can be taken after that much time has elapsed if no other transition is taken in between.

B. A value of zero indicates that the transition can be taken immediately. The transition is said to be enabled when its guard evaluates to zero.

C. A negative value indicates that the transition can never be taken unless some other transition is taken which renders the guard nonnegative.

V. The transition type. A transition may be of one or more of the following types: proaction, reaction, response.

A. A proaction is taken at the time indicated by its guard.

B. A reaction is taken when all of the following conditions are satisfied:

1. The process is interrupted by an alert directed to the component,

2. The alert's event is the same as the reaction's input event, and

3. The reaction is enabled at the time the alert interrupts the process.

C. A response is taken because of event propagation.

VI. The transition action. The transition action creates, initializes and starts new components, changes the state and output variables of existing components, and makes and breaks connections and sends alerts to other processes. The following actions are permitted.

A. State Reset

1. Reset Variable: An output variable is reset using the supplied expression.

2. Reset Link: An output link is reset using the supplied expression.

3. Reset Continuous State: A continuous state is reset using the supplied expression.

B. Interprocess Communication

1. Make Connection: A connection is made to the supplied process

2. Break Connection: A connection to the supplied process is broken
3. Send Alert: An alert is sent to the supplied process. The alert class, event name, component id and alert parameters are supplied in the action.
C. Network Reconfiguration
1. Create and Start Component: A new component is created, setup and started. The component class and initial state are supplied in the action. If multiple components are to be created in the same action, it is recommended that the following sequence of phases be used.
    a) All the components are declared and created.
    b) Each component's variables and links are initialized.
    c) Each component is setup.
    d) Each component is started.
2. Update Event Propagation Dependencies: The event propagation dependencies between components are altered by adding or removing a component from another component's event propagation dependency.
D. Cast Event: The action's input event can be cast to be of any other event type.
E. Generic: Any C++ statements are specified.
VII. The output event. The output event is an object of class Event or one of its subclasses. It specifies the output event class, the output event label and any parameters used to instantiate the event. The output event is used for synchronization according to the event propagation rules.

2.4.3 Event Propagation State Transitions

Associated to each discrete state transition is a set of component references known as its dependents. The output event returned by a proaction or reaction is propagated to each of its dependents. Event propagation consists of finding in the dependent an enabled response transition labeled by the same input event as the propagated event and, if it exists, taking that transition. Events returned by responses are not propagated.

3 Event Model

An event is described in terms of its output variables, links and functions. Each event has the variable named event of type int. It is assigned one of the event labels of the application's transitions. Each event also has the variable named senderId of type long int. It is assigned the identifier of the entity that issues the event, as follows:
1. In case the sending entity is a Teja™ system server, senderId is initialized by the application developer with the id of the sending component (otherwise it is initialized as −1 by the system).
2. In case the sending entity is a Teja™ system client, senderId can be initialized by the application developer with an application-dependent value (otherwise it is initialized as −1 by the system).
3. In case the sending entity is a Teja™ system web server, senderId is initialized by the system find it contains a value that allows the web server to track the web browser that originated the request.

Thus the senderId field is used by the Teja™ system software only in the Teja™ system web servers. It is not used by the Teja™ application server-side or client-side system software.

4 Alert Model

An alert is described in terms of its output variables, links and functions. The Alert class is a subclass of the Event class. In addition to the inherited variables event and senderId, each alert has the variable named id of type long int and the variable named senderName of type char*. The first is assigned the identification of the component to which the alert is sent. The second is always initialized by the system with the name of the Teja™ model process from which the alert was sent.

5 Inheritance and Other Object-Oriented Features

The Component, Event and Alert models form a class hierarchy, shown in FIG. 3. The following rules are used with respect to inheritance and object-orientation.
1. Outputs and inputs are inherited through subclassing. They are public members of the component. Thus, in particular, output variables and links can be written from outside the component. Unless there is a strong reason for doing so, this practice should be avoided except when the component is initialized.
2. Output functions and input functions are virtual and they are dispatched dynamically. Thus, output and input functions provide abstract interfaces which can be refined in subclasses to take advantage of the refined subclass models.
3. States and state transitions are not inherited through subclassing. They are private members of the component. In case the process model is needed to be shared between different classes, the Teja™ Real-Time Designer™ tool provides the mechanism for importing the process model of one class into another.

6 Server Behavior

The Teja™ server performs the functions of the Teja™ scheduler.

6.1 Server Initialization

After initializing itself, the Teja™ server performs the user-specified, application-specific initializations such as connecting to a database or initializing any interfaces or devices.

6.2 Server Initial State

The server's initial state consists of components that are created, setup and started before the server begins its operation. The server's state can be initialized through a function call or by loading a previously dumped state file or both.

6.3 Server Evolution

The operational semantics of the Teja™ scheduler are described below, with reference to FIGS. 4-6.
1. The Teja™ scheduler identifies the earliest proactive transition (step 10). If such a transition exists, let it be called the scheduled transition.
    In selecting the earliest proaction, nondeterminism between components is resolved by preferring smaller values of id and nondeterminism between proactions is resolved by preferring those specified earlier in the model (as indicated by the programmer in the design phase).
    If there are components in transient states, they are searched before other components.
    Any fairness considerations should be programmed into the application. For example, if component 0 and component 1 both have an enabled transition at all times, then component 1 will never be scheduled. It is up to the user to ensure that both components get the opportunity to be scheduled.
    The identification is performed based on the known actions and components. Although the design tools generate software code corresponding to the actions and components, the occurrence of the components is triggered by real-world events that the real-time system is responding to. For example, one component may correspond to checking a sensor. This component will have a start time based on how long after the system is started that the sensor is to be checked. The software code for this component is first generated by the design tools. Then when the real-time system is activated, the component is stored along with its start time. The scheduler is then aware of this component along with any other components that are involved in the real-time system.

2. If no transition is scheduled, then the scheduler sleeps without a timeout (steps 12 and 14). If there is a scheduled transition and it exits a transient state the scheduler goes to number 7 below (steps 12 and 16). If there is a scheduled transition and it exits a non-transient state, the scheduler sleeps with a timeout of the firing delay of the scheduled transition (steps 12, 16 and 18).

3. On waking, it brings all continuous states up to date (steps 20 and 22). If T is the elapsed time during the sleep, x is a continuous state and x_dot is the rate of x, x is updated as $x = x + x\_dot * T$ 4. If it is woken by a shell command or a connection request (step 26a), it serves the interrupt and goes to number 1 above (step 26b).

5. If it is woken by a software or hardware interrupt for which an interrupt service routine has been registered (step 26c), it serves the interrupt and goes to number 6 below (step 26d). Typically the interrupt service routine raises an alert which is processed subsequently.

6. If it is woken by an alert input (step 26e), it identifies the component and a single enabled, synchronizing reactive transition in it (step 26f). If such a transition is not found, it goes to number 1 above. If it is found, then that transition replaces the scheduled transition (step 26g).
   Nondeterminism between reactions is resolved by preferring those specified earlier in the model.

7. It takes the scheduled transition by executing its action (step 28), and obtains the returned event (step 30). If the event is not null, it propagates this event to each dependent of the transition (step 32).
   Nondeterminism between responses is resolved by preferring those specified earlier in the model.

8. It reflects the discrete state change in all components participating in the event synchronization (step 34a) and deletes all the returned events (step 34b). The components participating in the event synchronization are the causing component (or equivalently, the scheduled component) plus all other components to which the resulting returned event was propagated.

9. It performs slip control if the system has slipped from real-time by more than the permitted amount (step 34c). Preferably the slip control is provided through the dynamic slip control process disclosed in co-pending U.S. patent application Ser. No. 09/318,913, which is incorporated herein by reference.

10. It writes transition logs if logging is enabled (step 34d), updates the database if databasing is enabled (step 34e) and then goes to number 1 above.

In the simulation mode, proactive transitions that are enabled in the future are scheduled immediately rather than waiting for physical time to elapse. This implies that, in simulation, asynchronous communication messages between servers have lower priority over proactive events within a server. In real-time execution, the priorities are the other way around. Thus, the behavior of a distributed system under simulation can be different from that under real-time operation. This is because, at a given physical time, in simulation the different distributed processes may have progressed by different amounts of simulation time, while in real-time execution, each distributed process progresses by the same amount of physical time.

There is only one exception to the priorities expressed above: proactions exiting a transient state always have higher priority than any other transition, both in real-time and in simulation mode. (Note that the use of the word "priority" is used in its normal meaning to indicate an arbitrary preference for the prioritized item, not as the term of art in computer task scheduling where a task is assigned a priority in order to schedule high priority tasks before low priority ones, as discussed above with reference to Stallings.)

FIGS. 7-11B are time lines showing examples of scheduling. FIG. 7 shows the unscheduled tasks T1-T5 that need to be scheduled in many existing real-time systems. Each task may have one or more computations (e.g., task T1 includes computations T1a and T1b). The dotted portion following each computation shows the allowable time in which that computation must be performed. Line 50 shows the arrival of an asynchronous interrupt, the results of which need to be propagated to other tasks via events 52a and 52b. The job of the programmer and scheduler is to schedule each computation such that it finishes within its allowable time while maintaining the required relationships of any propagated events. However, each time one task is replaced by another (e.g., in order to meet its deadline), a context switch is involved, increasing overhead as discussed above.

FIG. 8 shows the unscheduled arrival times of a number of actions A1-A24 grouped into components C1-C5. One job of the present invention is to schedule these actions so that they can be sequentially processed. Event dependencies between actions are shown by solid lines 52a and 52b.

FIGS. 9-11B show the process the scheduler goes through when performing the steps set forth above and in FIG. 4.

FIG. 9 shows that the actions A1-A3 may be executed according to their arrival times because they are the only actions in existence in a particular processing interval. With reference to the steps of FIG. 4, we will start at the time marked by line 54. The earliest proactive transition is action 57 (step 10). Action 57 is a scheduled transition (step 12) and does not exit a transient state (step 16), so the system sleeps for the period designated by line 56 (step 18). Upon waking (step 20), the system executes action 57 (step 28). Action 57 has no returned events (steps 30 and 32), so the system performs the post-execution processing (step 34) and identifies the next earliest proactive transition as action 61 (step 10). The sleep periods 60 and 58 and the execution of actions 61 and 59 follow the steps given above regarding action 57.

FIG. 10A shows how the earliest proactive transition may be identified (step 10) when the scheduler knows actions 64, 66 and 68 will have the same start time. Actions 64 and 68 belong to the same component 72 which has an id of 199. Action 66 belongs to component 74 with an id of 197. Action 64 was sequenced in the design phase to be scheduled before action 68. Based on this information, FIG. 10B shows that the scheduler sleeps for a period 70 and then executes action 66 because its component 74 has a smaller value of id. Then action 64 is scheduled before action 68 because action 64 was designated earlier in the design phase.

Figure 11B:
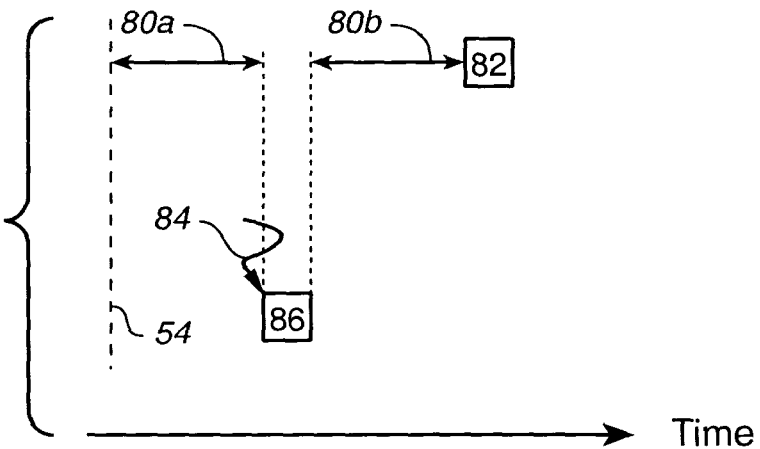

FIGS. 11A-11B illustrate the interrupt process (step 26). In FIG. 11A, the scheduler has scheduled action 82 and is sleeping for sleep period 80 until the scheduled transition (step 18). However, the unplanned arrival of alert 84 and its corresponding action 86 interrupts the sleep period 80. FIG. 11B then shows how the sleep period 80 is interrupted by the alert 84 into a shorter sleep period 80a. The scheduler was woken by an interrupt (step 24), so it proceeds to interrupt processing (step 26). Alert 84 is an alert input (step 26e), and the scheduler can identify action 86 as an identifiable component and transition (step 26f). The scheduler then replaces action 82 with action 86 as the scheduled transition (step 26g) and then executes the action 86 (step 28). The scheduler then identifies action 82 as the earliest proactive transition (step 10) and sleeps until the scheduled transition (step 18) for a sleep period 80b.

6.4 Server Shutdown

In the server shutdown phase, in addition to cleaning up Teja™ system resources, the server carries out any user-specified, application-specific shutdown functions such as disconnecting from the database or resetting any open interfaces or devices.

7 Client Behavior

The Teja™ model does not impose any model on client processes. Their behaviors are entirely governed by the application software. Typical client behavior consists of providing the operator with access to the state of the system from the application database, access to the system's state history from the application logs and enabling the operator to send alerts to the server processes and receive alerts back from them.

When a client is started up, the Teja™ model first performs its own initializations and then it hands over control to the user-specified client code. The Teja™ model provides useful interfaces for client programming.

Teja™ clients can function as CORBA connectivity processes. This functionality is used for integrating the Teja™ application with legacy software through CORBA protocols Differences from Other Schedulers The Teja™ scheduler has a number of differences from, and advantages over, existing schedulers. First, Stallings at pages 431-32 states that "current real-time operating systems typically include . . . preemptive scheduling based on priority . . . " Stallings at page 446 states that for real-time operating systems, "[a]lgorithms that rely heavily on preemption . . . are appropriate in this context." Stallings at page 431 states, "In a real-time system . . . it is essential to allow the user fine-grained control over task priority." In contrast to this teaching, the present invention has neither preemption of an executing action nor priority-based scheduling of actions.

Second, Stallings at page 392 states that "very short time quanta should be avoided". In contrast to this teaching, the present invention schedules components that are divided into short actions, making for a very short time quantum given to each action. The time quantum is set by the programmer during the design phase. Given the scheduling scheme set forth in FIG. 4, if the scheduler is currently executing an action, an interrupt will not interrupt that action. The transition associated with the interrupt will not begin until the currently-executing action has been completed. Therefore, the programmer can take the desired interrupt response time into account when selecting the time quantum.

Third, the present invention scales better than the task scheduling model. There is no practical limit on the number of simultaneous "tasks" waiting to be executed. Successful operations of the scheduler according to the present invention have run with components into the 1000000s or more.

Other new and unique contributions of the present invention include the following:

1. A multi-rate hybrid automaton-based component model (of which the scheduler is a part) in which the continuous variable rates are determined by the state of the system at the time each discrete state is entered (see section 2.4.1).

2. Classification of transitions into proactions, reactions and responses (see section 2.4.2, item V).

3. Real-time guard conditions for transition firing based on the state of the world (see section 2.4.2, item IV).

4. Action primitives for state reset, inter-process communication and network reconfiguration (see section 2.4.2, item VI).

5. Multi-cast input-output event propagation with dynamically changing propagation dependencies (see section 2.4.3).

6. Provision for mainstreaming hardware and software interrupts (see FIG. 5, steps 26c and 26d).

7. On-line algorithm for the extraction of a real-time event schedule based on the state of the world. (This is the process of FIG. 4 operating on the basis of the overall model plus the state of the world).

8. Inheritance and client-server programming (see sections 1.3 and 5).

CONCLUSION

It should be understood that various alternatives to the embodiments of the invention described herein may be employed in practicing the invention. It is intended that the following claims define the scope of the invention and that Structures within the scope of these claims and their equivalents are covered thereby.

The invention claimed is:

1. A method of scheduling a plurality of components to be performed by a computing device, wherein:

the plurality of components each has a unique identifier used to select the earliest component from said plurality of components;

the plurality of components each has an action with the earliest start time;

the act of identifying the earliest component comprises selecting the earliest component from the plurality of components having an action with the earliest start time based on the unique identifiers;

each component has a scheduled component start time and includes a plurality of actions;

each component of said plurality of components includes a plurality of states;

each of the plurality of actions being non-preemptible and suitable for execution by the computing device, and each of the plurality of non-preemptible actions having a scheduled action start time, said method comprising:

determining an earliest action start time from among the plurality of scheduled action start times for the plurality of non-preemptible actions, wherein the plurality of actions has at least one relationship there between;

identifying an earliest component having the earliest action with the earliest action start time;

executing a first action, which has the earliest action start time of the plurality of actions from the identified earliest component and is selected from those actions that have a same earliest start time based on a predefined preference associated with the first action, to completion without preemption;

obtaining a returned event from said executed first action in accordance with said executing;

propagating said returned event to a second action from dependent components of the earliest component if any second action is present;

updating one or more state of said plurality of states related to the earliest component, after said propagating; and receiving an interrupt and in response to receiving the interrupt performing one of:
  (i) when the interrupt is received after the act of identifying an earliest action start time and before the act of executing the first action, and in accordance therewith servicing said received interrupt and then performing again the act of identifying the earliest component having the earliest action with the earliest action start time, wherein said interrupt corresponds to one of a shell command and a connection request;
  (ii) when the interrupt is received after the act of identifying an earliest component and before the act of executing, and in accordance therewith identifying a component corresponding to said interrupt and a reactive action therein, and in accordance therewith executing said reactive action instead of the identified earliest action, wherein said interrupt corresponds to an alert input; and
  (iii) when the interrupt is received after the act of identifying an earliest component and before the act of executing, and in accordance therewith servicing said interrupt and then identifying a component corresponding to said interrupt and a reactive action therein, and in accordance therewith executing said reactive action instead of the identified first action, wherein said interrupt corresponds to one of a hardware interrupt having an interrupt service routine and a software interrupt having said interrupt service routine.

2. The method according to claim 1, further comprising: dividing at least one of said components into said plurality of non-preemptible actions, wherein each of said plurality of actions are scheduled for non-preemptive execution and are non-preemptively executed.

3. The method according to claim 1, wherein all of the components to be performed by the computing device are performed non-preemptively using non-preemptible actions implemented as function calls without context switching.

4. The method according to claim 1, wherein the determining an earliest action start time is a dynamic determination wherein the earliest action start time is computed dynamically at the end of execution of each action.

5. The method according to claim 1, wherein each action is executed as a function call, and each action includes one or more instructions.

6. The method according to claim 1, wherein there is no priority-based scheduling of actions, and no preemption of any executing actions, including no preemption of an executing action by an interrupt.

7. The method according to claim 1, wherein the method provides a scheduler that examines the actions which are implemented as function calls, and schedules them so that all of the ready actions are executed in the order they are required to be executed by the application.

8. A computer-readable medium encoded with a computer program code for scheduling a plurality of components to be performed by a computing device, wherein:
  the plurality of components each has a unique identifier used to select the earliest component from said plurality of components;
  the plurality of components each has an action with the earliest start time;
  the act of identifying the earliest component comprising selecting the earliest component from the plurality of components having an action with the earliest start time based on the unique identifiers;
  each component has a scheduled component start time and includes a plurality of actions, each of the plurality of actions being non-preemptible and suitable for execution by the computing device;
  each component of said plurality of components includes a plurality of states;
  each of the plurality of non-preemptible actions has a scheduled action start time, the program code causing the computing device to execute a method comprising:
    determining an earliest action start time from among the plurality of scheduled action start times for the plurality of non-preemptible actions, wherein the plurality of non-preemptible actions has at least one relationship there between;
    identifying an earliest component having the earliest action start time;
    executing a first action, which has the earliest action start time of the plurality of actions from the identified earliest component and is selected from those actions that have a same earliest start time based on a predefined preference associated with the first action, to completion without preemption;
    obtaining a returned event from said executed first action in accordance with said executing;
    propagating said returned event to a second action from the earliest component if any second action is present;
    updating one or more state of said plurality of states related to the earliest component, after said propagating; and
    receiving an interrupt and in response to receiving the interrupt performing one of:
      (i) when the interrupt is received after the act of identifying an earliest action start time and before the act of executing the first action, and in accordance therewith servicing said received interrupt and then performing again the act of identifying the earliest component having the earliest action with the earliest action start time, wherein said interrupt corresponds to one of a shell command and a connection request;
      (ii) when the interrupt is received after the act of identifying an earliest component and before the act of executing, and in accordance therewith identifying a component corresponding to said interrupt and a reactive action therein, and in accordance therewith executing said reactive action instead of the identified earliest action, wherein said interrupt corresponds to an alert input; and
      (iii) when the interrupt is received after the act of identifying an earliest component and before the act of executing, and in accordance therewith servicing said interrupt and then identifying a component corresponding to said interrupt and a reactive action therein, and in accordance therewith executing said reactive action instead of the identified first action, wherein said interrupt corresponds to one of a hardware interrupt having an interrupt service routine and a software interrupt having said interrupt service routine.

9. The computer-readable medium according to claim 8, the method further comprising:

dividing at least one of said components into said plurality of actions, wherein each of said plurality of actions are suitable for non-preemptive execution.

10. The computer-readable medium according to claim 8, wherein all of the components to be performed by the computing device are performed non-preemptively using non-preemptible actions implemented as function calls without context switching.

11. A system for scheduling a plurality of components, the system comprising:
- a computing device configured to receive a plurality of components, wherein:
  - the plurality of components each have a unique identifier used to select the earliest component from said plurality of components;
  - the act of identifying the earliest component comprising selecting the earliest component from the plurality of components having an action with the earliest start time based on the unique identifiers;
  - each component having a scheduled component start time and each component including a plurality of actions, wherein the plurality of non-preemptible actions have at least one relationship there between;
  - each component of said plurality of components includes a plurality of states;
  - each of the plurality of actions being non-preemptible and suitable for non-preemptive execution by the computing device;
  - each of the plurality of non-preemptible actions has a scheduled action start time; and
- a scheduling program in communication with the computing device, the scheduling program configured to:
  - determine an earliest action start time from among the plurality of scheduled action start times for the plurality of non-preemptible actions;
  - identify an earliest component having the earliest action start time;
  - select for execution by the computing device, to completion without preemption, a first action which has the earliest action start time of the plurality of actions and is selected from those actions that have a same earliest start time based on a predefined preference associated with the first action, from the identified earliest component;
  - obtain a returned event from said executed first action;
  - propagate said returned event to a second action from the earliest component if any second action is present;
  - update one or more state of said plurality of states related to the earliest component, after said propagating;
  - receive an interrupt and in response to receiving the interrupt performing one of:
    - (i) when the interrupt is received after the act of identifying an earliest action start time and before the act of executing the first action, and in accordance therewith servicing said received interrupt and then performing again the act of identifying the earliest component having the earliest action with the earliest action start time, wherein said interrupt corresponds to one of a shell command and a connection request;
    - (ii) when the interrupt is received after the act of identifying an earliest component and before the act of executing, and in accordance therewith identifying a component corresponding to said interrupt and a reactive action therein, and in accordance therewith executing said reactive action instead of the identified earliest action, wherein said interrupt corresponds to an alert input; and
    - (iii) when the interrupt is received after the act of identifying an earliest component and before the act of executing, and in accordance therewith servicing said interrupt and then identifying a component corresponding to said interrupt and a reactive action therein, and in accordance therewith executing said reactive action instead of the identified first action, wherein said interrupt corresponds to one of a hardware interrupt having an interrupt service routine and a software interrupt having said interrupt service routine.

12. The system according to claim 11, wherein the scheduling program is further configured to:
  - divide at least one of said components into said plurality of actions, wherein each of said plurality of actions are suitable for non-preemptive execution.

13. The system according to claim 11, wherein all of the components to be performed by the computing device are performed non-preemptively using non-preemptible actions implemented as function calls without context switching.

* * * * *